UNITED STATES PATENT OFFICE.

EDWARD D. HOUSTON, OF WORCESTER, MASSACHUSETTS, ASSIGNOR, BY DIRECT AND MESNE ASSIGNMENTS, TO THE NATIONAL ONION SALT COMPANY, OF DENVER, COLORADO, A CORPORATION OF COLORADO.

SEASONING AND METHOD OF MAKING THE SAME.

13,495. Specification of Reissued Letters Patent. Reissued Dec. 10, 1912.

No Drawing. Original No. 970,712, dated September 20, 1910, Serial No. 553,954. Application for reissue filed September 18, 1912. Serial No. 721,101.

*To all whom it may concern:*

Be it known that I, EDWARD D. HOUSTON, a citizen of the United States, residing at Worcester, in the county of Worcester and State of Massachusetts, have invented a new and useful Seasoning and Method of Making the Same, of which the following is a specification.

This invention relates to a seasoning for use with foods, and to a method of making the same.

The principal objects of the invention are to provide a palatable seasoning suitable for general use as a substitute for a natural flavor, but particularly on meats, which can be very cheaply and expeditiously manufactured, and can be put up or packed in small packages and used conveniently at the table, and which shall be of such a nature that it will keep for indefinite periods of time without deteriorating or losing its strength.

Broadly considered, the invention also involves the production of a new article of food particularly for seasoning purposes which will add materially to the economy of the table, because it will render foods palatable that ordinarily would not be, and because it will permit the use of a certain flavor at all seasons of the year and in places where the vegetable from which it is derived could not be readily transported.

Further objects and advantages of the invention will appear hereinafter.

I am aware that seasoning materials have been made from dried and pulverized vegetables with or without other constituents but my invention involves a new product and a process of making it whereby the vegetable fiber is better preserved and all of the flavor retained. In order to obtain such a seasoning material it has been proposed to thoroughly desiccate a desired vegetable, grind it to powdered form and mix with salt but it is difficult to maintain such a mixture in a homogeneous condition and the salt does not and cannot come in intimate contact with any of the vegetable fiber except the exposed surface thereof.

In carrying out my invention I bring salt into the most intimate contact with the fiber, and prevent the salt and fiber from separating after the product is manufactured by causing a quantity of the salt to dissolve in the juice of the vegetable and in direct contact with the fiber. The dissolved salt permeates into the cellular structure of the fiber and becomes most intimately associated therewith. Upon drying the mass, the aqueous portions of the juice are driven off and the salt is caused to precipitate or crystallize within and upon the fiber. The evaporating is carried on at a comparatively low temperature so that the fiber is not injuriously affected by the heat and all of the essential oils and other non-volatile constituents of the juice are retained in the fiber which acts as a carrier.

In its preferred embodiment the invention consists in the preparation of the ordinary onion so that it may be used for seasoning purposes in the manner above specified. The invention although more suitable for the utilization of onions is capable also of application to some other vegetables for the purpose of utilizing them in a similar way. For purposes of illustration I will describe one way in which my improved method may be carried out and one product which is obtained, using onion as the vegetable being treated.

A quantity of onions or other vegetables containing moisture, say for example, 100 lbs., are peeled sufficiently to expose their inner moist surfaces, and they may be cut up into pieces of any desired size. With these onions a quantity of common salt is mixed, preferably less than 50%, and in the example indicated, about 40 lbs. are ordinarily used. This salt is applied to the onions in any desired way as by sprinkling or pouring it over their surface, and it has been found in practice that the more of the exposed moist or juice covered surfaces of the onions are covered by the salt the more rapid and thorough is the action hereinafter described. This mixture of the salt and onion preferably is accomplished by placing the onions or pieces thereof in layers in a receptacle and sprinkling the salt over each layer before the superposed layers are introduced. Almost as soon as the salt is applied to the moist surfaces of the onion a partial liquefaction takes place by the partial dissolving of the salt in the onion juice. This may both cause a partial disintegration of the cell walls of the onion and a liberation of the air which is held by the porous structures of the onion. Numerous small bubbles are formed and appear in the form of a froth on the surface of the onion and indicate that the salt is dissolving and entering the cellular structure. Apparently the dissolved salt enters the solid portions of the vegetable as stated, but what further chemical action takes place, if any, I am not prepared to state. After this action has commenced the whole mixture is run through a grinding machine or otherwise finely divided in any desired way and reduced to a pulp. I find that this above described action between the salt and onion continues during the grinding operation, and afterward, and that the pulp produced in this way is comparatively thin and creamy, the particles going through the grinder being very minute. In this way the salt comes in contact with the smallest surface of the onion and by the time a mass of the above described proportions is thoroughly ground the action of the salt on the onion is substantially complete, the formation of air bubbles ceases, and no further time need be allowed for this action. The next step is to evaporate the aqueous portions of the juice which I do by placing the mixture in a dry, warm place, and leaving it for sufficient time. For a mixture, such as that described above, exposed in a suitable receptacle, placed on an ordinary steam radiator at a temperature of steam under a very low pressure, the evaporation requires about two days. It will be remembered that the particles of onion are extremely small. I have generally used a grinder from which no particle of pulp, which is more than one 16th of an inch in diameter can emerge. When the substance is evaporated as aforesaid it is found to form thin flakes, very often apparently consisting of a sheet of vegetable pulp of irregular size and shape but of approximately uniform thickness coated, chiefly on one side with crystallized salt. These flakes unite with each other in various forms, and form masses of from a quarter to a half inch across. They are quite light in weight and of a yellowish to light brown color, except where crystals of salt appear, when they are pure white. I assume from this that an excess of salt has been used, and that part of the salt not taken up by the vegetable pulp crystallizes out and appears on the surface thereof. This material can be used in this form as a seasoning for the purpose of mixing in soups and various other dishes. If it is desired, however, to use it on the table to place on meats and the like after they are prepared so that each individual may suit his own taste, these flaky masses are pulverized in any desired way and placed in an ordinary salt shaker or some such receptacle. When so pulverized the product is in the form of small particles of fiber with salt crystals adhering thereto. I have found that in either form the material will keep its dry and granular condition for a long time, that it does not cake together in the salt shaker, and that the onion flavor, as well as the salt taste is preserved for long periods of time. This makes the seasoning a very convenient one to use, and extremely suitable for use on the table as well as for seasoning foods while they are being prepared. The resultant product is readily sub-divided into any desired quantities, can be transported to any distance and into any climate, can be kept until the particular vegetable of which it is made is out of season, can be made so inexpensively that it is within the reach of all. Also the flavor is such that it will add materially to the value of foods which are of a more or less tasteless character thus permitting economy at table.

I do not wish to be limited to each particular step or order of steps, or to all the details of the product, which I have described.

What I do claim is:

1. The method of making seasoning which consists in producing a mixture of finely ground vegetable fiber, vegetable juice and common salt in solution in said juice, evaporating the aqueous portions of said juice to crystallize said salt in contact with said fiber and then pulverizing the dry mass.

2. The method of making a seasoning which consists in dissolving salt in the juice exposed on the surfaces of fresh vegetable fiber, evaporating the juice to dry the vegetable fiber and crystallize the salt in intimate contact therewith and pulverizing the dry mass.

3. The method of making a seasoning which consists in bringing salt into intimate contact with the moist surface of onion fiber to form a solution of the salt in the juice of the onion and evaporating said juice to precipitate the salt in intimate contact with the onion fiber.

4. The method of making a seasoning which consists in subdividing a quantity of onions so as to expose the moist surfaces of the fibers and placing in contact with said moist surfaces a quantity of common salt, leaving the salt in contact with said surfaces until it partially dissolves in the juice of the onion, evaporating the aqueous portions of the onion juice to dry the fiber and to precipitate the dissolved salt in intimate contact therewith and pulverizing the same to produce a fine powder.

5. The method of making seasoning which consists in subdividing a quantity of onions so as to expose the moist surface of the onion fiber, bringing common salt into contact with said moist surfaces to permit the salt to partially dissolve in the onion juices, and evaporating the aqueous portion of the onion juice to leave the salt in intimate contact with the onion fiber.

6. The method of making seasoning which consists in subdividing a quantity of onions so as to expose the moist inner surfaces, adding thereto common salt in contact with said moist surfaces, permitting the salt to remain in contact with said surfaces until it partially dissolves in the juice of the onion, grinding the mixture to a pulp and drying in a warm place until the pulp forms into a dry mass.

7. The method of making seasoning which consists in subdividing a quantity of onions so as to expose their moist inner surfaces, adding thereto common salt in contact with said moist surfaces, permitting the salt to remain in contact with said surfaces until it partially dissolves in the onion juice, grinding the mixture to pulp, drying in a warm place until the pulp forms into a mass consisting of onion fiber with crystals of salt thereon and pulverizing the same to fine powder.

8. The method of making a seasoning which consists in subdividing a quantity of onions so as to expose the moist inner surfaces, placing in contact with said moist surfaces a quantity of common salt, leaving the salt in contact with said surfaces until it partially dissolves in the onion juice thereon, reducing the mixture to pulp, drying until the pulp forms into a substantially dry mass and pulverizing the same to produce a fine powder.

9. The method of making seasoning which consists in peeling a quantity of onions so as to expose the moist inner surfaces, adding thereto about 40% by weight of common salt in contact with said moist surfaces, permitting the salt to remain in contact with said surfaces until bubbles in the form of a froth appear thereon, grinding the mixture to a pulp, and drying in a warm place until the pulp forms into a mass consisting of dry flakes.

10. The method of making seasoning which consists in peeling a quantity of onions so as to expose the moist inner surfaces, adding thereto about 40% by weight of common salt in contact with said moist surfaces, permitting the salt to remain in contact with said surfaces until bubbles in the form of froth appear thereon, grinding the mixture to a pulp, drying in a warm place until the pulp forms into a mass consisting of dry flakes, with crystals of salt upon one side thereof, and pulverizing the same to produce a fine powder.

11. The method of making a seasoning which consists of peeling a quantity of onions so as to expose the moist inner surfaces, placing in contact with said moist surfaces a quantity of common salt, leaving the salt in contact with said surfaces until bubbles in the form of froth appear thereon, reducing the mixture to a pulp, drying until the pulp forms into a mass of dry flakes, and pulverizing the same to produce a fine powder.

12. As an article of manufacture, a seasoning consisting of onion with salt thereon in the form of masses of dry flakes, having onion pulp on one side and salt crystals on the other.

13. As an article of manufacture, a seasoning consisting of onion in the form of masses of dry flakes, having crystals of salt thereon.

14. As an article of manufacture a seasoning consisting of onion fiber with salt crystals adhering thereto.

15. As an article of manufacture a seasoning consisting of onion in the form of masses of dry particles having crystals of salt thereon.

16. As an article of manufacture a seasoning consisting of finely subdivided onion fiber with crystals of salt adhering to the particles thereof.

17. As an article of manufacture a seasoning consisting of particles of onion fiber and salt formed thereon by crystallization.

18. As an article of manufacture a vegetable fiber in a dry, finely subdivided form, the non volatile portions of juice of the vegetable and salt attached to the fiber by crystallization.

EDWARD D. HOUSTON.

Witnesses:
RUFUS B. DODGE,
C. W. FAIRBANK.